United States Patent
Schweitzer et al.

(10) Patent No.: US 12,263,705 B2
(45) Date of Patent: Apr. 1, 2025

(54) TIRE

(71) Applicant: The Goodyear Tire & Rubber Company, Akron, OH (US)

(72) Inventors: Claude Schweitzer, Colmar-Berg (LU); Alexis Sosnowski, Montois la Montagne (FR); Serge Guillaume Feltes, Hagondange (FR)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 17/930,833

(22) Filed: Sep. 9, 2022

(65) Prior Publication Data
US 2024/0100891 A1 Mar. 28, 2024

(51) Int. Cl.
*B60C 11/00* (2006.01)
*B60C 19/08* (2006.01)

(52) U.S. Cl.
CPC ........ *B60C 19/082* (2013.01); *B60C 11/0041* (2013.01); *B60C 11/0058* (2013.01); *B60C 2011/0025* (2013.01)

(58) Field of Classification Search
CPC ............ B60C 11/0041; B60C 11/0058; B60C 19/082; B60C 2011/0025
See application file for complete search history.

(56) References Cited

U.S. PATENT DOCUMENTS

| | | | | |
|---|---|---|---|---|
| 4,385,653 A | * | 5/1983 | Okazaki | B60C 11/18 |
| | | | | 152/549 |
| 5,901,766 A | | 5/1999 | Sandstrom et al. | |
| 9,441,098 B1 | | 9/2016 | Isitman et al. | |
| 9,757,987 B2 | | 9/2017 | Jacoby et al. | |
| 10,364,342 B2 | | 7/2019 | Brace | |
| 10,519,300 B2 | | 12/2019 | Brace | |
| 10,821,777 B2 | | 11/2020 | Isitman et al. | |
| 2004/0112490 A1 | * | 6/2004 | Sandstrom | B60C 11/005 |
| | | | | 152/209.5 |

(Continued)

FOREIGN PATENT DOCUMENTS

| | | |
|---|---|---|
| EP | 2455232 B1 | 8/2013 |
| EP | 2799480 A1 * | 11/2014 |

(Continued)

OTHER PUBLICATIONS

Machine translation for Japan 07-164821 (Year: 2023).*
(Continued)

*Primary Examiner* — Steven D Maki
(74) *Attorney, Agent, or Firm* — Mandy B. Willis (57) ABSTRACT

The present invention is directed to a tire having a tread comprising two shoulder portions and a center portion axially between the two shoulder portions, wherein at least one of the shoulder portions comprises a first rubber composition and the center portion comprises a second rubber composition different from said first rubber composition. The first rubber composition has a shear storage modulus which is at least 10% lower than the shear storage modulus of the second rubber composition, and the second rubber composition has a glass transition temperature which is at least 5% higher than the glass transition temperature of the first rubber composition.

19 Claims, 2 Drawing Sheets

(56) References Cited

U.S. PATENT DOCUMENTS

| | | |
|---|---|---|
| 2010/0012245 A1* | 1/2010 | Kameda .............. B60C 11/005 152/209.5 |
| 2013/0338256 A1 | 12/2013 | Steiner et al. |
| 2015/0239296 A1* | 8/2015 | Fukuda .............. B60C 11/0041 152/209.5 |
| 2016/0059636 A1* | 3/2016 | Zhao .............. B60C 11/0058 152/209.5 |
| 2016/0376427 A1 | 12/2016 | Sandstrom et al. |
| 2017/0037225 A1 | 2/2017 | Isitman et al. |
| 2017/0051135 A1 | 2/2017 | Sandstrom et al. |
| 2017/0166732 A1 | 6/2017 | Isitman et al. |
| 2017/0232795 A1 | 8/2017 | Isitman et al. |
| 2018/0154696 A1* | 6/2018 | Isitman .............. C08L 15/00 |
| 2019/0061425 A1* | 2/2019 | Broemmel .............. C08L 9/06 |
| 2019/0225778 A1 | 7/2019 | Weydert et al. |
| 2019/0330452 A1 | 10/2019 | Isitman et al. |
| 2020/0094623 A1 | 3/2020 | Isitman |
| 2021/0046783 A1 | 2/2021 | Schweitzer et al. |
| 2021/0402827 A1 | 12/2021 | Jacoby et al. |

FOREIGN PATENT DOCUMENTS

| | | | |
|---|---|---|---|
| JP | 61-037503 A | * | 2/1986 |
| JP | 07-164821 A | * | 6/1995 |
| WO | WO-2020/065903 A1 | * | 4/2020 |

OTHER PUBLICATIONS

Machine translation for Japan 61-037503 (Year: 2023).*
Partial translation for Japan 61-037503 (Year: 2023).*
Clark, Mechanics of Pneumatic Tires, pp. 20-29, Aug. 1981 (Year: 1981).*
U.S. Appl. No. 17/657,251, filed Mar. 30, 2022.
Extended European Search Report for Application No. 23194472.9, dated Feb. 7, 2024.

* cited by examiner

TIRE

FIELD OF THE INVENTION

The present invention is directed to a tire, in particular a pneumatic summer tire, having a tread with two shoulder portions and a center portion, wherein the center portion comprises a different rubber composition than one or both of the shoulder portions.

BACKGROUND OF THE INVENTION

As known in the tire art, it has traditionally been difficult to improve multiple tire characteristics at the same time without considerable trade-offs in at least another characteristic. One of such conflicts exists between rolling resistance and wet performance. When rolling resistance is to be improved, there are typically trade-offs in wet grip. However, limiting rolling resistance is crucial to increase energy efficiency.

Moreover, there may be further preferences of tire performance depending on the type of vehicle equipped with the tires. In particular, it may be desirable for some SUV or van tires to reduce the maximum lateral force achieved during tire force & moment tests or cornering maneuvers. In some cases, the risk of rollovers shall be further reduced which may have a higher probability for vehicles having a relatively high center of mass. In particular, a low maximum lateral force can be associated with a limited rollover probability. Despite of the desire to reduce the maximum lateral force, it can still be desirable to provide an advanced wet grip and/or cornering stiffness of the tire.

The development of the balance of two or more properties selected from limited maximum lateral force, cornering stiffness, wet grip, and/or rolling resistance of tires leaves still room for improvement.

SUMMARY OF THE INVENTION

A first object of the present invention may be to provide a tire having a tread supporting a limited rollover probability.

A second object of the invention may be to provide a tire having a limited maximum lateral force (also referred to herein as "Cf max") and an improved cornering power or, in other words, cornering stiffness (which are considered interchangeably herein) before reaching its maximum lateral force. At the same time wet grip performance should optionally be at a high level.

The present invention is defined by the scope of independent claim 1. Preferred embodiments are provided in the dependent claims as well as in the summary of the invention hereinbelow.

Thus, in a first aspect of the invention, the invention is directed to a tire having a tread, said tread comprising two shoulder portions and a center portion axially between the two shoulder portions, wherein at least one of the shoulder portions comprises a first rubber composition and the center portion comprises a second rubber composition different from said first rubber composition. The first rubber composition has a shear storage modulus G' (1%) (or in other words a shear storage modulus at 1% strain) which is at least 10% lower than the shear storage modulus G' (1%) of the second rubber composition, and the second rubber composition has a glass transition temperature which is at least 5% higher (and/or at least 1° C. higher) than the glass transition temperature of the first rubber composition.

Hence, a shoulder portion having the first rubber composition is more flexible than the center portion having the second rubber composition. Together with the lower Tg of the shoulder portion relatively low maximum lateral forces can be obtained, while the higher Tg of the center portion helps to improve overall wet performance. These features help to reduce the maximum lateral force and also to improve wet performance, such as wet braking.

In one embodiment, the second rubber composition has a tangent delta value which is at least 10% lower than the tangent delta value of the first rubber composition. A higher tangent delta value of the first rubber composition results in a higher heat development in the shoulder portion, such as during cornering maneuvers, so that the shoulder portion becomes softer, thereby further reducing the maximum lateral force in the shoulder portion.

In another embodiment the second rubber composition has a glass transition temperature which is at least 10%, or even 15%, higher than the glass transition temperature of the first rubber composition. Preferably, the glass transition temperature of the second rubber composition is at most 50% higher, or even more preferably at most 40% higher than the glass transition temperature of the first rubber composition. The glass transition of a rubber composition is determined herein as described further below, and is in general determined and/or given in ° C. In addition, or alternatively, the second rubber composition has a glass transition temperature which is at least 2° C. higher, preferably at least 3° higher or at least 4° C. higher than the glass transition temperature of the first rubber composition; and/or the second rubber composition has a glass transition temperature which is at most 15° C., preferably at most 10° C. higher, than the glass transition temperature of the first rubber composition.

In another embodiment, the tread has circumferential ribs (such as 3, 4, 5, 6 or 7 ribs) including two shoulder ribs and at least one center rib (or 2, 3, 4, 5 center ribs) arranged axially between the two shoulder ribs, wherein each shoulder portion extends optionally at least over the axial width of the respective shoulder rib.

In still another embodiment, at least one or each shoulder portion extends in an axially inner direction to form at least a portion of the bottom of a circumferential groove adjacent the respective shoulder rib.

In still another embodiment, at least one or each shoulder portion extends in an axially inner direction to form the whole surface of the circumferential groove adjacent the respective shoulder rib. Optionally, the first shoulder portion extends in an axially inner direction to a position within the lateral width of a circumferential rib adjacent said circumferential groove adjacent the respective shoulder rib.

In still another embodiment, each shoulder portion extends from the radially outermost surface of a respective shoulder rib at least to the bottom of an axially adjacent circumferential groove, or preferably also to a position (e.g. at least 1 mm or at least 2 mm) radially below the bottom of an axially adjacent groove. Preferably, each shoulder portion extends from the radially outermost surface of a respective shoulder rib to a radially innermost portion of the tread or tread cap. In particular, in case the tread has a tread cap layer and a tread base layer, the shoulder portion may extend radially inwards until a radially outer surface of the tread base layer.

In still another embodiment, the center portion comprises from 2 to 4 circumferential (center) ribs.

In yet another embodiment, the first rubber composition comprises one or more of the following:
- from 50 phr to 90 phr (preferably to 80 phr) of filler comprising at least 80% (preferably at least 90 percent) by weight of silica;
- at least 15 phr (preferably at least 18 phr, or even more preferably at least 20 phr or 21 phr) of a hydrocarbon resin;
- from 2 phr to 20 phr (optionally up to 15 phr or up to 9 phr) of liquid plasticizer (liquid plasticizers can include oil and/or liquid diene based polymers, preferably oil);
- from 1 to 5 phr of a rosin;
- from 1 phr to 5 phr of an alkyl phenol formaldehyde resin, such as an octyl phenol formaldehyde resin; and
- at least 40 phr of a diene based rubber functionalized for the coupling to silica.

In still another embodiment, the first rubber composition comprises one or more of:
- 5 phr to 30 phr of natural rubber and/or synthetic polyisoprene;
- 10 phr to 35 phr of polybutadiene rubber; and
- 35 phr to 85 phr of styrene butadiene rubber (preferably, of solution polymerized styrene butadiene rubber which is optionally functionalized for the coupling to silica).

In still another embodiment, the first rubber composition comprises a hydrocarbon resin, wherein the hydrocarbon resin is selected from one or more of:
i) a (high molecular weight) resin having a weight average molecular weight within a range of 1000 g/mol to 5000 g/mol, preferably within a range of 1100 g/mol to 5000 g/mol, or from 1600 g/mol to 5000 g/mol, or even more preferably from 1600 g/mol to 2900 g/mol;
ii) a terpene resin, which is optionally a beta-pinene based terpene resin;
iii) a resin having a softening point within a range of 100° C. to 150° C., preferably within a range of 105° C. to 145° C.;
iv) a resin having a glass transition temperature within a range of 50° C. to 100° C., preferably from 60° C. to 90° C.

For instance, the resin has the combination of all of features i) to iv). The high molecular weight resin has been found by the inventors to be preferable as it reduces the maximum lateral force of the tire. In particular, the inventors have discovered that the maximum lateral force decreases, particularly essentially linearly, with increasing molecular weight of the resin.

In another embodiment, the first rubber composition comprises the hydrocarbon resin within a range of 15 phr to 35 phr, preferably within a range of 15 phr to 30 phr or even more preferably within a range of 20 phr to 29 phr.

In yet another embodiment, the second rubber composition comprises one or more of the following:
- from 50 phr to 90 phr (preferably to 80 phr) of filler comprising at least 80% (preferably at least 90 percent) by weight of silica;
- from 0 phr to 10 phr of a hydrocarbon resin, preferably from 0 phr to 5 phr of a hydrocarbon resin;
- from 0 phr to 25 phr of liquid plasticizer (such as oil or liquid diene based polymers, preferably oil); and
- at least 40 phr of a diene based rubber functionalized for the coupling to silica.

In still another embodiment, the second rubber composition comprises one or more of:
- 5 phr to 30 phr of natural rubber and/or synthetic polyisoprene;
- 10 phr to 35 phr of polybutadiene rubber; and
- 35 phr to 85 phr of styrene butadiene rubber (preferably, solution polymerized styrene butadiene rubber and/or styrene butadiene rubber functionalized for the coupling to silica).

In still another embodiment, the second rubber composition comprises less than 10 phr, preferably less than 5 phr, of traction resin (or resins) and/or less than 10 phr, preferably less than 5 phr, of the resin present in the first rubber composition.

In another embodiment, the first rubber composition and the second rubber composition are one of: sulfur vulcanizable rubber compositions, and sulfur vulcanized rubber compositions.

In another embodiment, the second rubber composition has a plasticizer to filler ratio which is within a range of 0.01 (preferably 0.03) to 0.3 (preferably to 0.2 or to 0.15) and/or the first rubber composition has a plasticizer to filler ratio within a range of 0.31 (preferably 0.35) to 0.9 (preferably 0.8). Plasticizers include liquid plasticizers, such as oil and/or liquid diene-based polymers, and (hydrocarbon) resins. Preferably, such resins have a softening point within a range of 70° C. to 150° C. Liquid means herein that a material is at 23° C. in a liquid state.

In still another embodiment, each shoulder portion has an axial width within a range of 10% to 30% of the total axial width of the tread. In other words, a shoulder portion comprising or consisting of the first rubber composition extends axially within a range of 10% to 30%, preferably from 15% to 25%, of the total axial width of the tread. Typically, the tread is extruded and bond to the remaining tire during the cure of the tire. The total axial width of the tread is determined by carrying out a cross section of the tire, in which the axial boundaries of the tread are directly visible or can be observed with a light microscope if necessary. In case the tread comprises a tread base layer, optionally including laterally/axially outermost wings, the width of the tread base layer is also considered in the determination of the total axial width of the tread. The width of the tread base layer is also observable in the axial cross section of the tire as described above. In particular, the person skilled in the art can easily distinguish other tire components in the tire from the tread (component), such as belt coatings, overlay coatings, sidewalls, reinforced plies or ply strips.

In still another embodiment, the center portion has an axial width within a range of 40% to 80%, preferably from 50% to 70%, of the total axial width of the tread.

In yet another embodiment, the center portion is cured to one or both shoulder portions and/or is in direct contact with one or both shoulder portions.

In still another embodiment, the tread further comprises a tread base layer supporting the center portion and the shoulder portions radially below the center portion and the shoulder portions. Optionally the tread base layer has at at least one of its axially outer edges a wing portion extending at least partially in a radially outer direction. Such a wing portion is sometimes also referred to as a skirt portion in the tire art.

In still another embodiment, the tread base layer comprises a (preferably electrically conductive) chimney (portion) extending to the radially outermost surface of the tread.

In yet another embodiment, the tread base layer comprises or consists of a third rubber composition, which is different from the first rubber composition and the second rubber composition. A chimney (portion), if any, preferably comprises or consists of the same, third rubber composition as the tread base layer.

In another embodiment, the first rubber composition has a shore A hardness within a range of 40 to 65 preferably 45 to 60, and the second rubber composition has a shore A hardness within a range of 50 to 75, preferably 55 to 70, and/or wherein the shore A hardness of the second rubber composition is at least by a shore A hardness of 5 higher than the shore A hardness of the first rubber composition. A shore A hardness is determined according to ASTM D2240 or equivalent. Optionally the shore A hardness of the second rubber composition is at most 20, preferably at most 15, shore A hardness larger than the shore A hardness of the first rubber composition. Thus, the maximum difference in both hardnesses is preferably limited.

In another embodiment, the shear storage modulus G'(1%) of the first rubber composition is within a range of 0.8 MPa to 2 MPa (preferably to 1.5 MPa) and the shear storage modulus G'(1%) of the second rubber composition is within a range of 1.6 MPa to 6 MPa, preferably from 2.1 MPa to 4.5 MPa.

The shear storage modulus G' is determined herein based on ASTM D5289 or equivalent, in particular at a temperature of 100° C., a frequency of 1 Hz and at 1% strain, such as with a RPA 2000™ Rubber Process Analyzer of the company Alpha Technologies.

In another embodiment, the shear storage modulus G'(1%) of the first rubber composition is at least 10% lower, and optionally at most 80% lower than the shear storage modulus G'(1%) of the second rubber composition. Preferably, the shear storage modulus G'(1%) of the first rubber composition is at least 20% or 30% lower, and optionally at most 70% lower than the shear storage modulus G'(1%) of the second rubber composition.

In another embodiment, both shoulder portions comprise the first rubber composition.

In another embodiment, one or both shoulder portions consist of the first rubber composition and/or the center portion consists of the second rubber composition. However, in such an embodiment it is still an option that a chimney portion extends through one or more of said portions, e.g. from a tread base layer. Typically, the axial width of the chimney portion is less than 3 mm.

In still another embodiment, the tangent delta of the first rubber composition is within a range of 0.11 to 0.30, preferably of 0.12 (optionally 0.125) to 0.19 and the tangent delta of the second rubber composition is within a range of 0.05 to 0.12 (optionally 0.11).

Tangent Delta is determined herein based on ASTM D5289 or equivalent, at a temperature of 100° C., a frequency of 1 Hz and at 10% strain, such as with a RPA 2000™ Rubber Process Analyzer of the company Alpha Technologies.

In another embodiment, the first rubber composition has a Tg within a range of −15° C. to −30° C. and the second rubber composition has a Tg within a range of −10° C. to −25° C.

In yet another embodiment, the first rubber composition has a Tg within a range of −30° C. to −22° C. and/or the second rubber composition has a Tg within a range of −21° to −10° C. In particular, the inventors have discovered that the lower Tg results in a reduced maximum lateral force. This effect is even more prominent for large slip angles of the tire. At moderate slip angles, for instance less than 5° or less than 4°, the maximum lateral force of the lower Tg composition can be still similar to that of the higher Tg composition. But at larger slip angles, such as at least 8° or 9°, the maximum lateral force of the lower Tg composition is significantly lower compared to the maximum lateral force of the higher Tg rubber composition.

In still another embodiment, said tire is one or more of: a summer tire; a radial tire; a tire having two bead portions and one carcass ply extending radially between the bead portions, and from 2 to 3 belt plies provided radially below the tread and radially above the carcass ply in a crown region of the tire; one of a passenger car tire and a van tire; and a pneumatic tire.

In an embodiment, the rubber composition may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers, and emulsion polymerization prepared butadiene/acrylonitrile copolymers.

In another embodiment, an emulsion polymerization derived styrene/butadiene (ESBR) might be used having a styrene content of 20 to 28 percent bound styrene or, for some applications, an ESBR having a medium to relatively high bound styrene content, namely, a bound styrene content of 30 to 45 percent. In many cases the ESBR will have a bound styrene content which is within the range of 26 percent to 31 percent. By emulsion polymerization prepared ESBR, it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

As described herein, in another embodiment, solution polymerization prepared SBR (SSBR) may be used. Such an SSBR may for instance have a bound styrene content in a range of 5 to 50 percent, preferably 9 to 36, percent, and most preferably 26 to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively, the SSBR is thio-functionalized. This helps to improve stiffness of the compound and/or its hysteresis behavior. Thus, for instance, the SSBR may be a thio-functionalized and/or tin-coupled solution polymerized copolymer of butadiene and styrene.

In one embodiment, a synthetic or natural polyisoprene rubber may be used. Synthetic cis-1,4-polyisoprene and natural rubber are as such well known to those having skill in the rubber art. In particular, the cis 1,4-microstructure content may be at least 90% and is typically at least 95% or even higher.

In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95° C. to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A glass transition temperature, or Tg, of an elastomer represents the glass transition temperature of the respective elastomer in its uncured state. A glass transition temperature of an elastomer/rubber composition represents the glass transition temperature of the elastomer composition in its cured state. A Tg is determined as a peak midpoint by a differential scanning calorimeter (DSC) at a temperature rate of increase of 20° C. per minute, according to ASTM D3418 or equivalent.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR, NR and/or synthetic polyisoprene. In another example, the composition may include less than 5 phr, preferably less than 3, phr of an additional diene-based rubber or be also essentially free of such an additional diene-based rubber. The terms "compound" and "composition" and "formulation" may be used herein interchangeably, unless indicated otherwise. The terms "rubber" and "elastomer" may also be used herein interchangeably.

Molecular weights of elastomers/rubbers and resins, such as Mn (number average molecular weight), Mw (weight average molecular weight) and Mz (z average molecular weight), are determined herein using gel permeation chromatography (GPC) according to ASTM 5296-11 using polystyrene calibration standards, or equivalent.

In another embodiment, the rubber composition includes at least one resin, preferably having a glass transition temperature Tg greater than 20° C. A Tg for resins is determined as a peak midpoint by a differential scanning calorimeter (DSC) at a temperature rate of increase of 10° C. per minute, according to ASTM D6604 or equivalent. Preferably, the resin has a softening point of at least 70° C. as determined by ASTM E28 which might sometimes be referred to as a ring and ball softening point.

In another embodiment, the resin or hydrocarbon resin is selected from the group consisting of coumarone-indene resin, petroleum hydrocarbon resin, terpene polymers/resins, styrene/alphamethylstyrene resins, terpene phenol resin, rosin derived resins and copolymers and/or mixtures thereof.

A coumarone-indene resin preferably contains coumarone and indene as monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cyclopentadiene, and diolefins such as isoprene and piperlyene.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefines containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above, and are known as C5/C9 copolymer resins.

In an embodiment, C5 resins are aliphatic resins made from one or more of the following monomers: 1,3-pentadiene (e.g., cis or trans), 2-methyl-2-butene, cyclopentene, cyclopentadiene, and dicyclopentadiene.

In another embodiment, a C9 resin is a resin made from one or more aromatic monomers, preferably chosen from the group of indene, methylindene, vinyl toluene, styrene and methylstyrene (such as alpha-methylstyrene).

In still another embodiment, a C9 modified resin is a resin (such as a C5 resin) which has been modified or functionalized with one or more aromatic monomers, preferably chosen from the group of indene, methylindene, vinyl toluene, styrene and methylstyrene (such as alpha methylstyrene).

Terpene resins are preferably comprised of polymers of at least one of limonene, alpha pinene, beta pinene and delta-3-carene. Some preferred resins of such a type are mentioned herein above.

Terpene-phenol resins may be derived by copolymerization of phenolic monomers with terpenes such as limonenes, pinenes and delta-3-carene.

Representative for resins derived from rosins and derivatives thereof are, for example, gum rosin, wood rosin and tall oil rosin. Gum rosin, wood rosin and tall oil rosin have similar compositions, although the amount of components of the rosins may vary. Such resins may be dimerized, polymerized or disproportionated. Such resins may be in the form of esters of rosin acids and polyols such as pentaerythritol or glycol.

A styrene/alphamethylstyrene resin is considered herein to be a (preferably relatively short chain) copolymer of styrene and alphamethylstyrene with a styrene/alphamethylstyrene molar ratio in a range of about 0.05 to about 1.50. In one aspect, such a resin can be suitably prepared, for example, by cationic copolymerization of styrene and alphamethylstyrene in a hydrocarbon solvent. Thus, the contemplated styrene/alphamethylstyrene resin can be characterized, for example, by its chemical structure, namely its styrene and alphamethylstyrene contents and by its glass transition temperature, molecular weight and molecular weight distribution.

In one embodiment, said resin is partially or fully hydrogenated.

In an embodiment, the rubber composition comprises oil, such as processing oil. Oil may be included in the rubber composition as extending oil typically used to extend elastomers. Oil may also be included in the rubber composition by addition of the oil directly during rubber compounding. Oil used may include both extending oil present in the elastomers, and (process) oil added during compounding. Suitable oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils.

Glass transition temperatures Tg for oils are determined as a peak midpoint by a differential scanning calorimeter (DSC) at a temperature rate of increase of 10° C. per minute, according to ASTM E1356, or equivalent.

In an embodiment, the rubber composition comprises silica. Silica may be for instance pyrogenic/fumed or precipitated silica. In preferred embodiments, precipitated silica is used. Silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area is determined according to ASTM D6556 or equivalent and is described in the Journal of the American Chemical Society, Volume 60, Page 304 (1930). Silica may also be characterized by having a dibutylphthalate (DBP) absorption value in a range of 100 cm$^3$/100 g to 400 cm$^3$/100 g, alternatively 150 cm$^3$/100 g to 300 cm$^3$/100 g which is determined according to ASTM D 2414 or equivalent. Silica may have an average ultimate particle size, for example, in the range of 0.01 to 0.05 micron as determined by the electron microscope, although the silica particles may be even smaller, or possibly larger, in size. Various commercially available silicas may be used, such as, only for example herein, and without limitation, silicas commercially available from PPG Industries under the Hi-Sil trademark with designations 210, 315G, EZ160G, etc.; silicas available from Solvay, with, for example, designations of Z1165MP and Premium200MP, etc.; and silicas available from Evonik AG with, for example, designations VN2 and Ultrasil 6000GR, 9100GR, etc.

In still another embodiment, the rubber composition may comprise pre-silanized and/or hydrophobated silica which may for instance have a CTAB adsorption surface area of between 130 m2/g and 210 m$^2$/g, optionally between 130 m2/g and 150 m$^2$/g and/or between 190 m2/g and 210 m$^2$/g, or even between 195 m2/g and 205 m$^2$/g. The CTAB (cetyl trimethyl ammonium bromide) method for determination of the silica surface area (ASTM D6845) is known to the person skilled in the art.

Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and a DBP number ranging from 34 cm3/100 g to 150 cm3/100 g. Iodine absorption values are determined according to ASTM D1510 or equivalent.

In an embodiment, the content of carbon black is at most 10 phr, preferably less than 8 phr or less than 4 phr.

Typically, the carbon black content is at least 0.1 phr.

In one embodiment, the rubber composition may contain sulfur containing organosilicon compounds or silanes. Examples of suitable sulfur containing organosilicon compounds are of the formula:

in which Z is selected from the group consisting of where R1 is an alkyl group of 1 to 4 carbon atoms, cyclohexyl or phenyl; R2 is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be where R2 is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention may for instance be carried out at conventional temperatures ranging from 100° C. to 200° C. In one embodiment, the vulcanization is conducted at temperatures which are within a range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

All of the above aspects, embodiments and features of those can be combined with one another.

BRIEF DESCRIPTION OF THE DRAWINGS

The invention will be described by way of example and with reference to the accompanying drawings in which.

DETAILED DESCRIPTION OF THE INVENTION

Figure 1:
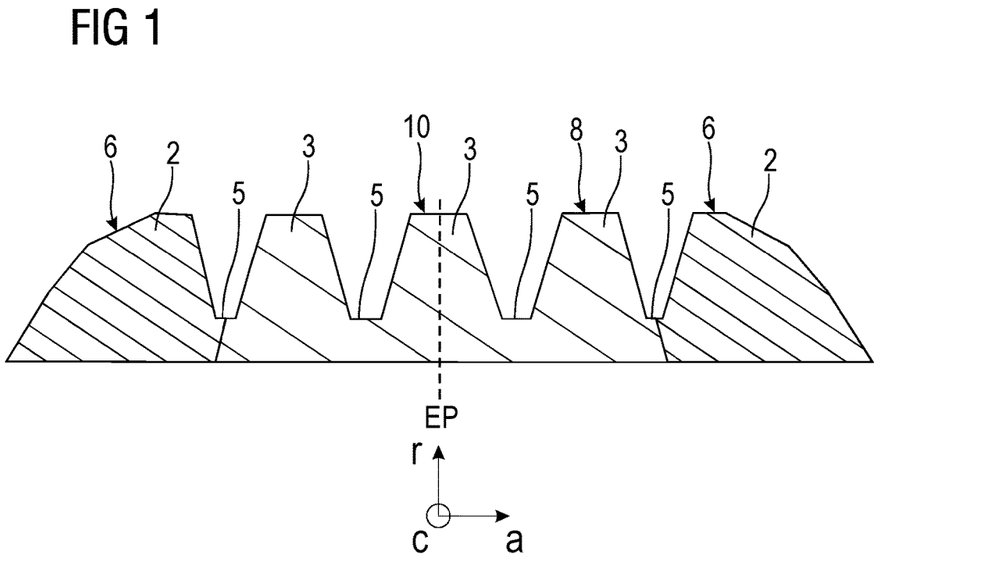
FIG. 1 is a schematic cross-section of a tire tread in accordance with a first embodiment of the present invention.

FIG. 1 shows a schematic cross-section of a tire tread 10 in accordance with a first embodiment of the present invention. The tread 10 comprises two shoulder portions 6 and a central portion 8 arranged axially between the two shoulder portions 6. Each shoulder portion comprises a circumferential shoulder rib 2 and the central portion 8 comprises in the present non-limiting embodiment three circumferential (center) ribs 3. Circumferential grooves 5 are arranged between two adjacent circumferential ribs. The equatorial plane of the tire is indicated by the reference sign EP. The two shoulder portions 6 comprise a first rubber composition and the central portion 8 comprises a second rubber composition which is different from the first rubber composition. In particular, the first rubber composition has a stiffness which is lower than the stiffness of the second rubber composition, and the second rubber composition has a tangent delta value which is lower than the tangent delta value of the first rubber composition. An example of a first rubber composition in accordance with an embodiment of the present invention is shown hereinbelow in Table 1.

TABLE 1

| Inventive Example - First Rubber Composition | |
|---|---|
| Material | Amount (phr) |
| NR[1] | 20 |
| SBR 1[2] | 55 |
| BR[3] | 25 |
| Silica[4] | 70 |
| Oil | 7 |
| Silane 1[5] | 5.6 |
| Stearic Acid | 2 |
| Waxes | 2 |
| Resin[6] | 22.6 |
| Antidegradants[7] | 4 |
| Alkylphenol resin[8] | 2 |
| Rosin[9] | 2 |
| Sulfur | 1.2 |
| Zinc Oxide | 1.1 |

TABLE 1-continued

| Inventive Example - First Rubber Composition | |
|---|---|
| Material | Amount (phr) |
| Silane 2[10] | 2 |
| Accelerators[11] | 2.6 |

[1]Natural rubber
[2]Solution-polymerized styrene butadiene rubber having a Tg of −27° C., functionalized for the coupling to silica, as HPR 355H from JSR
[3]Polybutadiene rubber having a Tg of −109° C., as Buna CB 25 from Arlanxeo
[4]Precipitated silica as Zeosil™ 1165 MP from Solvay
[5]Bis-triethoxysilylpropyl disulfide as SI 266 from Evonik
[6]Polyterpene resin based on beta-pinene as Sylvatraxx™ 4150 from Arizona Chemical, having a Mw of about 2200 g/mol and a softening point of about 115° C.
[7]TMQ and PPD
[8]Unreactive 100% octyl phenol formaldehyde resin, as SP 1068 from the SI Group
[9]Gum rosin
[10]50% Bis-triethoxysilylpropyl tetrasulfide on 50% N330 carbon black carrier, as X50S from Evonik
[11]DPG and TBBS The rubber composition according to Table 1 comprises a moderately, essentially silica filled rubber compound which comprises predominantly a solution polymerized styrene butadiene rubber functionalized for the coupling to silica. Moreover, the rubber composition comprises a high molecular weight polyterpene resin. The further resin and rosin in the composition help to further support an advanced wet braking behavior in the composition. In general, the relatively high plasticizer level helps to obtain a relatively soft and flexible compound, whereas the high silica ratio allows for an acceptable wet braking performance.

As further shown in Table 3 below, the first rubber composition has a relatively low stiffness, hardness and also a relatively low Tg, which helps to reduce the maximum lateral force of the compound, in particular in cornering maneuvers. This results in a further decreased roll-over probability which is, for example, of particular interest for SUVs and vans.

However, in this embodiment it is less desirable to have such a compound over the whole width of the tire tread. In particular, the tread shall also have good cornering power and/or good wet braking performance, which can be further improved by an appropriate compound in the center portion of the tread.

In an embodiment of the present invention, the center portion of the tire tread comprises the second rubber composition according to Table 2.

TABLE 2

| Inventive Example - Second Rubber Composition | |
|---|---|
| Material | Amount (phr) |
| NR | 21 |
| SBR 1 | 49 |
| SBR 2[12] | 41.25 |
| Silica[13] | 70 |
| Carbon Black | 3 |
| Oil | 6 |
| Processing aid[14] | 2 |
| Silane 1 | 7 |
| Stearic Acid | 2 |
| Waxes | 1.5 |
| Antidegradants | 3.5 |
| Sulfur | 1.4 |
| Zinc Oxide | 2 |
| Accelerators[15] | 4.6 |

[12]Solution polymerized styrene butadiene rubber having a Tg of −24° C., with an oil extension of 11.25 phr in the amount used herein
[13]ULTRASIL™ 9100GR from Evonik
[14]Glycerine monoester of stearic acid, as Ligalub 11
[15]DPG and CBS It is emphasized that the rubber composition disclosed in Table 2, which is suitable as the second rubber composition, is only a non-limiting example. Other rubber compositions having similar properties could be used for the center portion of the tread. However, preferably, the rubber composition of the center portion comprises a limited amount of plasticizer, in particular of resin, such as traction and/or high molecular weight resin. In general, the plasticizer to filler ratio of the second rubber composition can be lower than the plasticizer to filler ratio of the first rubber composition as in the composition shown in Table 2.

Figure 2:
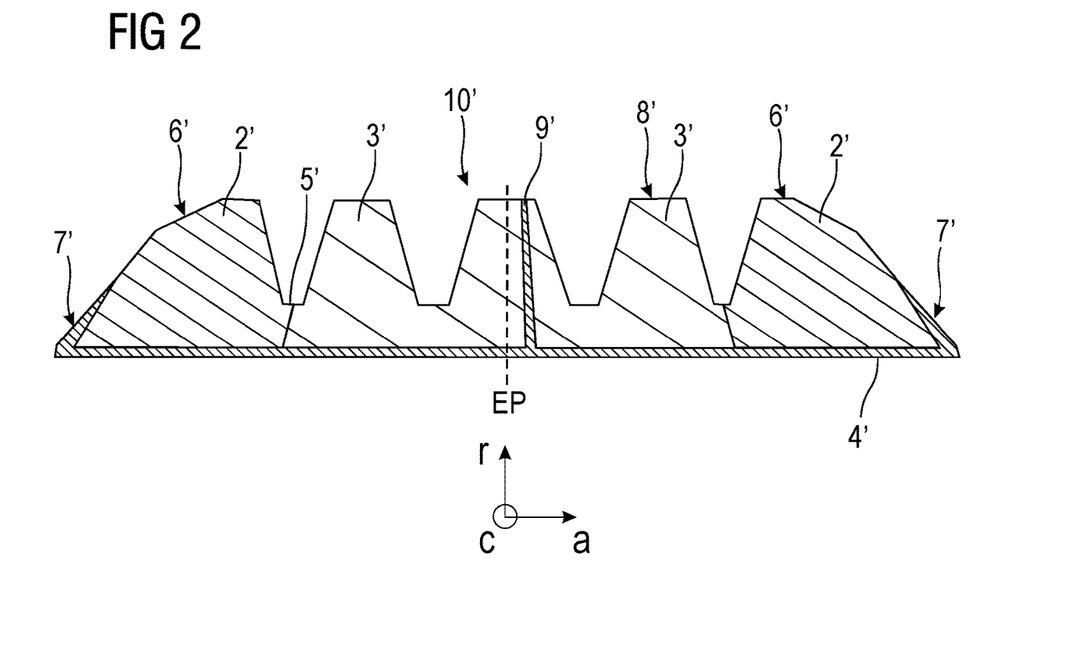
FIG. 2 is a schematic cross-section of a tire tread in accordance with a second embodiment of the present invention.

FIG. 2 shows another embodiment of a tire tread 10' which has, compared with the tire tread 10 according to FIG. 1, an additional tread base layer 4'. This tread base layer 4' has a third rubber composition which is different from the first rubber composition and the second rubber composition. The third rubber composition as such could be a known base rubber composition used in base tread layers. As further shown in FIG. 2, the tread base layer 4' has optionally one or two wing portions 7' and/or a chimney portion 9'. Preferably, the electrical conductivity of the tread base layer 4' is higher than that of the center portion 8' and/or the electrical conductivity of the shoulder portions 6' of the tread 10'. Such features can help providing an electrically conductive path from the radially outermost surface of the tire tread 10' to the radially innermost side of the tire tread 10'.

Similar to the embodiment of FIG. 1, it is possible that the first rubber composition of the shoulder portions 6' extends axially over at least a part (or the whole) of the bottom of the grooves 5' between an axially outermost rib or shoulder rib 2' and a rib 3' of the center portion 8'.

Figure 4:
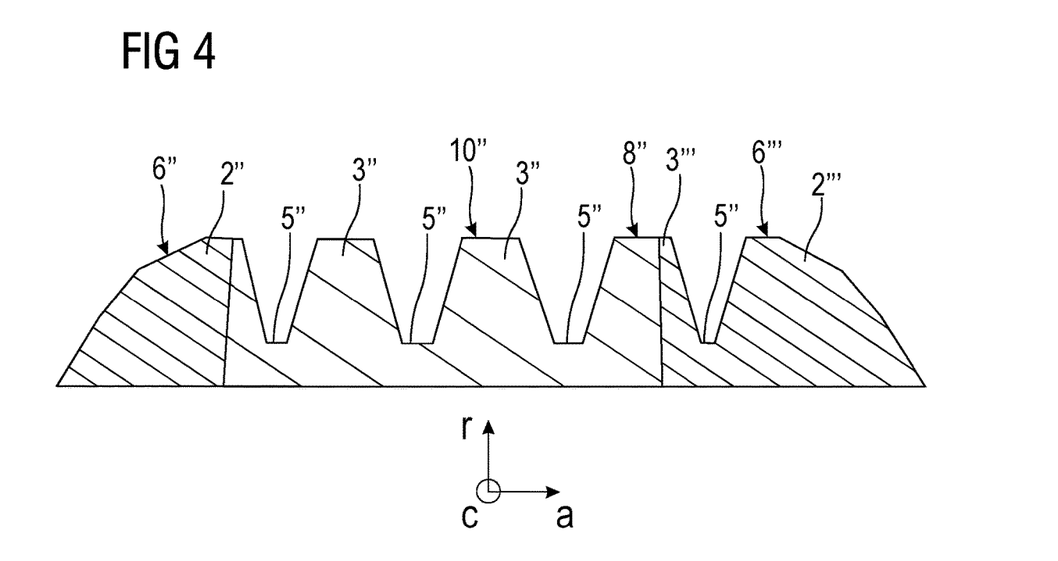
FIG. 4 is a schematic cross-section of another tire tread in accordance with a third embodiment of the present invention.

FIG. 4 shows yet another embodiment of a tire tread 10" which has a center portion 8" two different shoulder portions 6" and 6"', circumferential grooves 5", center ribs 3" and 3"' as well as shoulder ribs 2" and 2"'. In this embodiment, the shoulder portion 6" extends axially only to an axial position within the shoulder rib 2".

In an alternative embodiment (not shown), the shoulder portion can axially extend in an axially inner direction to the axially outermost sidewall of the groove adjacent the shoulder rib. Thus, the bottom of that groove would be formed by the second rubber composition. The split of the shoulder portion and the center portion is then at an axial position at the sidewall of the axially outer sidewall of the groove adjacent the shoulder rib. Thus, the split is not easily visible on the tire tread. Moreover, the split is not at the bottom of the groove which might be less robust in view of potentially higher stresses in that area. Moreover, as in the embodiment of FIG. 4, such a split helps to increase the influence of the properties of the second rubber composition on the tread. In another embodiment, it is also possible that the split shown on the left hand side of FIG. 4 or the split discussed in the present paragraph is present at both lateral sides of the tread (not shown).

The shoulder portion 6' extends in an axially inner direction to the radially outermost surface of the rib 3"' which is adjacent the circumferential groove 5" adjacent the respective axially outermost shoulder rib 6"'. Such an embodiment helps to increase the influence of the first rubber composition on the tread 10". In another embodiment, it is also possible that such a split is present at both lateral sides of the tread (not shown).

Figure 3:
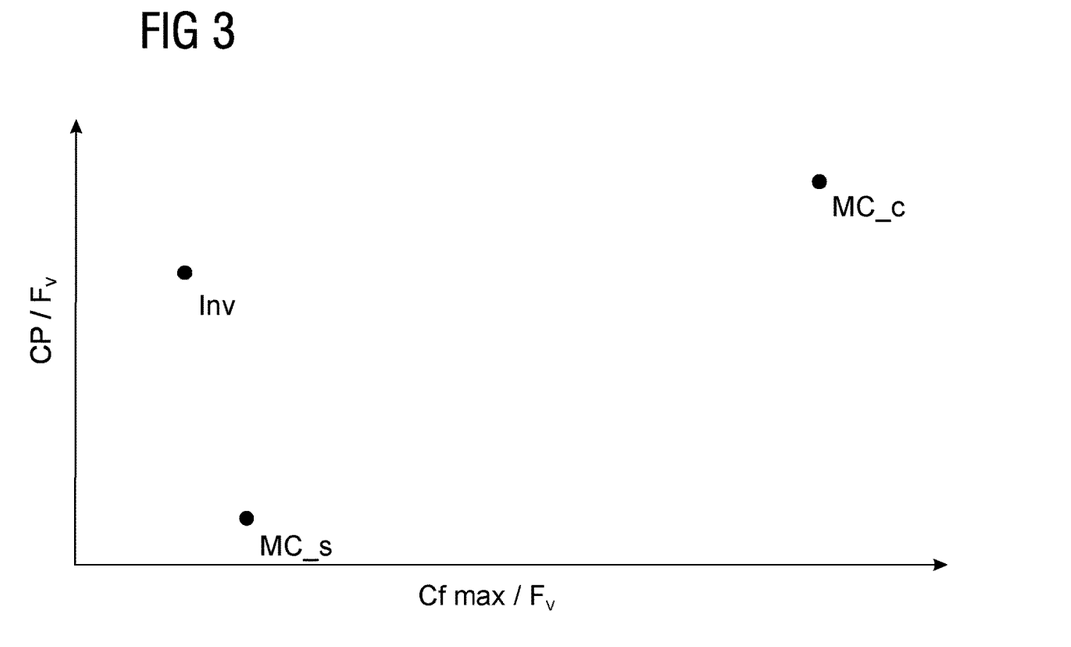
FIG. 3 is a diagram showing cornering power of a tire divided by the constant vertical load on the tire (CP/Fv) versus the maximum lateral force of the tire, also divided by the same constant vertical load on the tire (Cf max/Fv), with a first tire having a tread comprising only the first rubber composition (MC_s), a second tire having a tread comprising only the second rubber composition (MC_c), and a third tire having a tread in accordance with an embodiment of the invention, comprising shoulder portions made of the first rubber composition and a center portion made of the second rubber composition (Inv)

FIGS. 1, 2 and 3 indicate schematically the radial direction r, the circumferential direction c and the axial direction a. It shall be understood that the axial direction a extends in two orientations. In general, the terms radial, axial and circumferential are used as common in the field of tires. In particular, the term circumferential shall be understood as the circumferential direction of a tire.

As shown in Table 3, the first rubber composition has a much lower stiffness indicator G'(1%) (shear modulus at 1% strain, measured herein at a temperature of 100° C. and a frequency of 1 Hz), and a much lower glass transition temperature Tg than the second rubber composition. Moreover, the Tangent Delta value of the first rubber composition is higher than that of the second rubber composition. The Shore A hardness of the first rubber composition is lower than that of the second rubber composition.

TABLE 3

| Property | Inventive Example First Rubber Composition | Inventive Example Second Rubber Composition |
| --- | --- | --- |
| G' (1%) [MPa]$^a$ | 1.3 | 2.8 |
| Tan Delta$^a$ | 0.14 | 0.11 |
| Composition Tg | −26° C. | −19° C. |
| Shore A$^b$ | 53 | 63 |

$^a$G' (shear modulus) and Tan Delta (tangent delta) are obtained herein with an RPA 2000 ™ Rubber Process Analyzer of the company Alpha Technologies, based on ASTM D5289 or equivalent. Shear Modulus is determined at 100° C., 1 Hz and 1% strain. Tangent Delta is determined herein at 100° C., 1 Hz and 10% strain.
$^b$Shore A hardness is determined according to ASTM D2240 or equivalent.

FIG. 3 is a diagram showing cornering power of a tire CP divided by the constant vertical load on the tire Fv, wherein Fv is herein 70% of the maximum load index of the tire, versus the maximum lateral force of the tire Cf max, also divided by the same constant vertical load on the tire Fv. Thus, the plotted values are dimensionless.

The points shown in the diagram of FIG. 3 are directed to a first tested tire having a tread comprising only the first rubber composition (MC_s), a second tested tire having a tread comprising only the second rubber composition (MC_c), and a third tested tire having a tread in accordance with an embodiment of the invention, comprising shoulder portions made of the first rubber composition and a center portion made of the second rubber composition (Inv). As visible in FIG. 3, the tire having a mono tread cap of the second rubber composition MC_c has a very high Cf max property which is undesirable when trying to limit that property. However, cornering power CP, or in other words, cornering stiffness, is relatively high which is usually desirable for advance driving performance. The mono tread cap MC_s made of the first rubber composition has a far better Cf max property but instead a quite low cornering power. In contrast, the split tread (cap) comprising shoulder portions having the first compound and a center portion having the second compound has a good balance between high cornering power CP and low maximum lateral force Cf max.

In general, the cornering power CP is of particular relevance for high speed maneuvers. The maximum lateral force Cf max can be understood as the force which a tire can laterally build up under a given load (here at 70% load index) when increasing the slip angle of the tire at a given speed. The testing conditions have been the same for all tires shown in FIG. 3. In particular, the tires were tested at constant speed and increasing slip angle. At a certain slip angle, the lateral force exerted by the tire stops increasing which is the maximum lateral force. Cornering power or cornering stiffness is the ratio of lateral force and slip angle determined at the linear section of the lateral force vs. slip angle curve at limited slip angles.

Moreover, the inventors have carried out wet braking tests and it turned out that the inventive tire (Inv) having shoulder portions made of the first rubber composition and a center portion made of the second rubber composition has also a wet braking performance which is similar to that of a tire having a mono cap tread with only the second rubber composition or a mono cap tread with only the first rubber composition. In particular, the inventive tire had only an about 1% to 2% increased wet braking distance compared to the tire comprising a mono cap with the second rubber composition. Thus, in addition to the preferred balance of maximum lateral force and cornering stiffness, the inventive tire has still preferable wet braking properties.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire comprising
a tread comprising two shoulder portions and a center portion axially between the two shoulder portions,
wherein at least one of the shoulder portions comprises a first rubber composition formed with a filler containing comprising at least 80% by weight silica, and the center portion comprises a second rubber composition different from said first rubber composition having a filler comprising at least 80% by weight silica, and
wherein the first rubber composition has a shear storage modulus G' (1%) which is at least 10% lower than a shear storage modulus G' (1%) of the second rubber composition, wherein the shear storage modulus G' (1%) is based on ASTM D5289 or equivalent at 100° C. and
wherein the second rubber composition has a glass transition temperature which is at least 5% higher than the glass transition temperature of the first rubber composition, wherein the first rubber composition has a Tg between −15° C. and −30° C. and the second rubber composition has a Tg between −16° C. and −25° C.

2. The tire according to claim 1,
wherein the second rubber composition has a tangent delta value which is at least 10% lower than the tangent delta value of the first rubber composition.

3. The tire according to claim 1,
wherein the tread has circumferential ribs including two shoulder ribs and at least one center rib arranged axially between the two shoulder ribs, and wherein each shoulder portion extends at least over the axial width of the respective shoulder rib.

4. The tire according to claim 3,
wherein at least one of the shoulder portions extends in an axially inner direction so as to form at least a portion of the bottom of a circumferential groove of the tread adjacent the respective shoulder rib.

5. The tire according to claim 1,
wherein the center portion comprises from 2 to 4 circumferential ribs.

6. The tire according to claim 1,
wherein the first rubber composition comprises one or more of the following:
from 50 phr to 90 phr of the filler comprising at least 80% by weight of the silica;
at least 15 phr of a hydrocarbon resin;
from 2 phr to 20 phr of liquid plasticizer; and
at least 40 phr of a diene based rubber functionalized for the coupling to silica.

7. The tire according to claim 6, wherein the first rubber composition comprises the hydrocarbon resin, and which is selected from one or more of:
a high molecular weight resin having a weight average molecular weight within a range of 1000 g/mol to 5000 g/mol, optionally within a range of 1600 g/mol to 2900 g/mol;
a terpene resin;
a resin having a softening point within a range of 100° C. to 150° C.;
a resin having a glass transition temperature within a range of 50° C. to 100° C.; and
a resin based on beta pinenes.

8. The tire according to claim 6, wherein the first rubber composition comprises the hydrocarbon resin within a range of 15 phr to 35 phr.

9. The tire according to claim 6,
wherein the second rubber composition comprises one or more of the following:
from 50 phr to 90 phr of filler comprising at least 80% by weight of silica;
from 0 phr to 10 phr of a hydrocarbon resin;
from 0 phr to 25 phr of liquid plasticizers; and
at least 40 phr of a diene based rubber functionalized for the coupling to silica.

10. The tire according to claim 6, wherein the second rubber composition comprises less than 5 phr of traction resins.

11. The tire according to claim 1, wherein the first rubber composition and the second rubber composition are one of: sulfur vulcanizable rubber compositions, and sulfur vulcanized rubber compositions.

12. The tire according to claim 1, wherein each shoulder portion has an axial width within a range of 10% to 30% of the total axial width of the tread.

13. The tire according to claim 12, wherein the center portion has an axial width within a range of 40% to 80% of the total axial width of the tread.

14. The tire according to claim 1, wherein the tread further comprises a tread base layer supporting the center portion and the shoulder portions radially below the center portion and the shoulder portions.

15. The tire according to claim 14, wherein the tread base layer comprises a chimney portion extending to the radially outermost surface of the tread.

16. The tire according to claim 1,
wherein the first rubber composition has a shore A hardness within a range of 40 to 65,
wherein the second rubber composition has a shore A hardness within a range of 50 to 75, and wherein the shore A hardness of the second rubber composition is at least by a shore A hardness of 5 higher than the shore A hardness of the first rubber composition.

17. The tire according to claim 1, wherein the shear storage modulus G' (1%) of the first rubber composition is within a range of 0.8 MPa to 2 MPa and wherein the shear storage modulus G' (1%) of the second rubber composition is within a range of 1.6 MPa to 6 MPa.

18. The tire according to claim 1, wherein the tangent delta of the first rubber composition is within a range of 0.125 to 0.30 and the tangent delta of the second rubber composition is within a range of 0.05 to 0.12.

19. The tire according to claim 1, wherein the tire is one or more of:
- a summer tire;
- a radial tire;
- a tire having two bead portions and one carcass ply extending radially between the bead portions, and from 2 to 3 belt plies provided radially below the tread and radially above the carcass ply in a crown region of the tire;
- one of a passenger car tire and a van tire; and
- a pneumatic tire.

* * * * *